(12) United States Patent
Yang et al.

(10) Patent No.: US 7,984,332 B2
(45) Date of Patent: Jul. 19, 2011

(54) DISTRIBUTED SYSTEM CHECKER

(75) Inventors: Junfeng Yang, New York, NY (US);
Lintao Zhang, Sunnyvale, CA (US);
Lidong Zhou, Cupertino, CA (US);
Zhenyu Guo, Beijing (CN); Xuezheng Liu, Beijing (CN); Jian Tang, Beijing (CN); Mao Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 12/272,779

(22) Filed: Nov. 17, 2008

(65) Prior Publication Data

US 2010/0125758 A1 May 20, 2010

(51) Int. Cl.
*G06F 11/00* (2006.01)
(52) U.S. Cl. ............... 714/31; 714/11; 709/223
(58) Field of Classification Search ......... 714/31
See application file for complete search history.

(56) References Cited

U.S. PATENT DOCUMENTS

| | | | |
|---|---|---|---|
| 5,544,310 A | | 8/1996 | Forman et al. |
| 5,619,644 A | | 4/1997 | Crockett et al. |
| 5,933,639 A | | 8/1999 | Meier et al. |
| 6,042,614 A | | 3/2000 | Davidson et al. |
| 6,058,393 A | | 5/2000 | Meier et al. |
| 6,760,911 B1 * | 7/2004 | Ye ............................ 719/314 |
| 6,789,114 B1 * | 9/2004 | Garg et al. ............... 709/224 |
| 6,961,926 B2 | | 11/2005 | Koyama |
| 7,133,820 B2 | | 11/2006 | Pennello et al. |
| 7,185,319 B2 | | 2/2007 | Kaler et al. |
| 7,200,734 B2 * | 4/2007 | Hyser ....................... 711/203 |
| 7,451,451 B2 * | 11/2008 | Schaefer ................... 719/310 |
| 7,536,591 B2 * | 5/2009 | Varadarajan et al. ........ 714/15 |
| 7,546,602 B2 * | 6/2009 | Hejlsberg et al. ......... 719/313 |
| 7,555,757 B2 * | 6/2009 | Smith et al. ............... 719/328 |
| 7,644,414 B2 * | 1/2010 | Smith et al. ............... 719/328 |
| 2003/0014510 A1 * | 1/2003 | Avvari et al. ............. 709/223 |
| 2003/0101382 A1 * | 5/2003 | Gabele et al. ............. 714/39 |
| 2003/0187927 A1 * | 10/2003 | Winchell ................... 709/204 |
| 2004/0103413 A1 * | 5/2004 | Mandava et al. ........... 718/100 |
| 2004/0153833 A1 * | 8/2004 | Deacon et al. ............. 714/38 |
| 2007/0050686 A1 * | 3/2007 | Keeton et al. ............. 714/48 |
| 2007/0061634 A1 * | 3/2007 | Marisetty et al. ......... 714/48 |
| 2007/0100967 A1 * | 5/2007 | Smith et al. ............... 709/219 |
| 2008/0134210 A1 * | 6/2008 | Georgalas ................. 719/318 |
| 2008/0216052 A1 * | 9/2008 | Hejlsberg et al. ......... 717/114 |
| 2008/0294942 A1 * | 11/2008 | Breitgand et al. ......... 714/38 |
| 2008/0301316 A1 * | 12/2008 | Alpern et al. ............. 709/231 |
| 2008/0320336 A1 * | 12/2008 | Qadir et al. ............... 714/42 |
| 2009/0006909 A1 * | 1/2009 | Ladd et al. ............... 714/57 |
| 2009/0094491 A1 * | 4/2009 | Sharma et al. ............ 714/57 |

(Continued)

OTHER PUBLICATIONS

Chandy, et al., "Distributed Snapshots: Determining Global States of Distributed Systems", ACM Transactions on Computer Systems, vol. 3, No. 1, Feb. 1985, pp. 63-75.

(Continued)

*Primary Examiner* — Scott T Baderman
*Assistant Examiner* — Kamini Patel (57) ABSTRACT

A distributed system checker may check a distributed system against events to detect bugs in the distributed system. The events may include machines crashes, network partitions, and packet losses, for example. The distributed system checker may check a distributed system that can have multiple threads and multiple processes running on multiple nodes. To obtain control over a distributed system, a distributed system checker may insert an interposition layer between a process and the operating system on each node.

20 Claims, 7 Drawing Sheets

U.S. PATENT DOCUMENTS

| | | | |
|---|---|---|---|
| 2009/0119542 A1* | 5/2009 | Nagashima et al. | 714/33 |
| 2009/0119578 A1* | 5/2009 | Relyea et al. | 715/234 |
| 2009/0177914 A1* | 7/2009 | Winchell | 714/4 |
| 2009/0248381 A1* | 10/2009 | Liu et al. | 703/13 |
| 2009/0327458 A1* | 12/2009 | Liu et al. | 709/221 |
| 2009/0327807 A1* | 12/2009 | Varadarajan et al. | 714/15 |
| 2010/0122343 A1* | 5/2010 | Ghosh et al. | 726/23 |

OTHER PUBLICATIONS

Sabel, et al., "Simulating Fail-Stop in Asynchronous Distributed Systems", Apr. 13, 1994, pp. 1-24.

Namita Naik, "Simulating Proactive Fault Detection in Distributed Systems", Sep. 4, 2007, pp. 1-18.

"Fundamentals of Distributed Computing: A Practical Tour of Vector Clock Systems", http://www.computer.org/portal/site/dsonline/menuitem.9ed3d9924aeb0dcd82ccc6716bbe36ec/index.jsp?&pName=dso_level1&path=dsonline/past_issues/0202/features&file=bal_print.xml&xsl=article.xsl&.

Killian, et al., "Mace : Language support for building distributed systems", In Proceedings of the ACM SIGPLAN 2007 Conference on Programming Language Design and Implementation, Dated: Jun. 11-13, 2007, 10 pages.

Musuvathi, et al., "CMC: A pragmatic approach to model checking real code", In Proceedings of the Fifth Symposium on Operating Systems Design and Implementation, 2002, 14 pages.

* cited by examiner

DISTRIBUTED SYSTEM CHECKER

BACKGROUND

A bug is an error, flaw, mistake, failure, fault or undocumented feature in a computer program that prevents it from behaving as intended, thereby producing an incorrect result, for example. Many bugs arise from mistakes and errors in a computer program's code or its design, and some bugs are caused by compilers producing incorrect code.

Distributed systems are directed to hardware and software systems containing more than one processing element or storage element, concurrent processes, or multiple programs, running under a loosely or tightly controlled regime. In distributed systems, a computer program is split up into parts that run simultaneously across multiple computers or nodes, with communications centralized via a network. Distributed programs often accommodate heterogeneous environments, network links of varying latencies, and unpredictable failures in the network or the nodes.

Distributed systems are becoming increasingly crucial as more and more infrastructures are distributed for performance, scalability, and reliability. Distributed systems are complicated and buggy because they should correctly handle all possible events, including rare events such as machine crashes, network partitions, and packet losses. Failures may come in the form of a node crash, a network partition, a message loss, or disk failures, for example.

Distributed systems are difficult to test due to complicated interactions between different components of the system, as well as unpredictable failures, events, and message deliveries. Complicated dependencies within a distributed system make it particularly challenging to enumerate the possible cases that the system must handle. Identifying bugs in distributed systems is also challenging. The current practice of finding bugs in distributed systems typically involves some form of random testing, such as network simulation, end-to-end testing, or analyzing logs. These techniques are not effective for finding the bugs that appear only in rare cases, and are unable to reproduce the bugs when such bugs appear in the tests.

Model checkers have been used to find errors in both the design and the implementation of distributed systems. Traditional model checkers take as input an abstract model of a system and explore the states based on the abstract model. Traditional model checkers require an abstract model of the distributed system that is to be checked. Writing an abstract model of the distributed system is costly and error prone, thus making application of model checking on distributed systems prohibitive.

SUMMARY

A distributed system checker may check a distributed system against events to detect bugs in the distributed system. The distributed system comprises nodes that each runs one or many processes on an operating system. An interposition layer is provided on each node between the processes and the operating system. The distributed system checker is in control over the distributed system via the interposition layer on each node.

In an implementation, the interposition layer is provided on an application programming interface (API) between the process and the operating system on each node.

In an implementation, the interposition layer may simulate events to detect a bug in the distributed system. Events may include a machine crash, a network partition, a message reorder, a message loss, or an API failure, for example. The interposition layer ensures that these simulated events are deterministic and consistent.

In an implementation, the distributed system checker may be centralized and the interposition layer may expose the events in generic form to the centralized distributed system checker. The distributed system checker may be operating system-independent.

In an implementation, a bounding heuristic may be used in a checking of the distributed system. The bounding heuristic may separate each action that runs on the distributed system into an internal state or an external state. A number of internal states may be bounded between external states.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
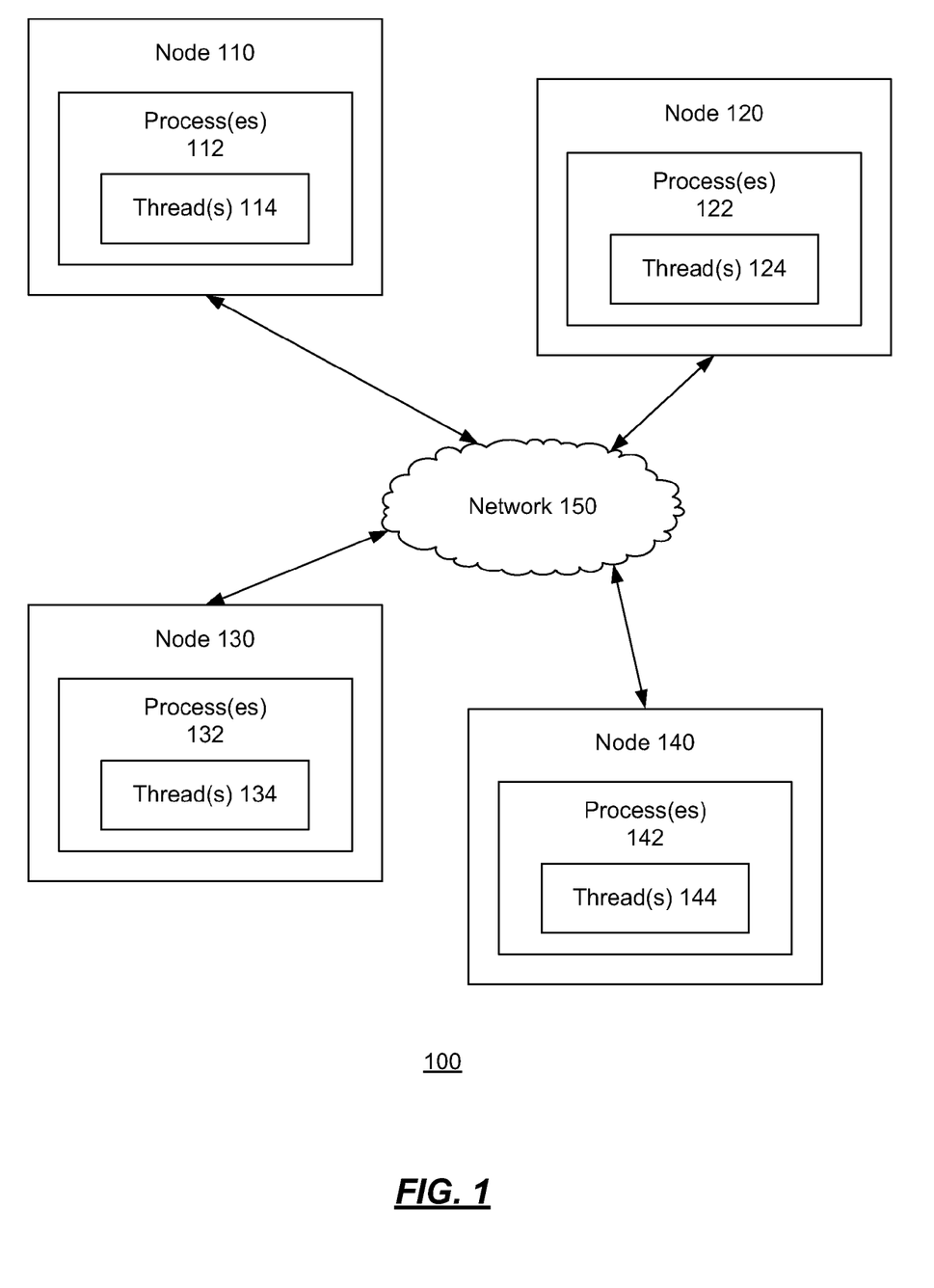
FIG. 1 is a block diagram of a distributed system that may be used with a distributed system checker.

FIG. 1 is a block diagram of a distributed system 100 that may be used with a distributed system checker as described herein. The distributed system 100 comprises nodes, such as nodes 110, 120, 130, 140 connected through a communications network 150, such as a local area network (LAN) or wide area network (WAN) for example. The nodes 110, 120, 130, 140 can communicate with each other by sending and receiving messages over the communications network 150. The nodes 110, 120, 130, 140 can read or write files stored on disk, i.e., they can have persistent states that survive machine crashes.

A node may be defined as a point in a network at which lines intersect or branch, a device attached to a network, or a terminal or other point in a network where messages can be transmitted, received, or forwarded. A node can be any device connected to a computer network. Nodes can be computers, personal digital assistants, cell phones, switches, routers, or various other networked devices, for example. Although only four nodes 110, 120, 130, 140 are shown in FIG. 1, any number of nodes may be connected to the network 150 and to each other. An example computer which may act as a node is described with respect to FIG. 7.

One or more processes 112, 122, 132, 142, each having one or more threads 114, 124, 134, 144, may run on each node 110, 120, 130, 140, respectively. The process(es) and thread(s) on each node may be used to communicate with other nodes and for carrying out distributed protocols.

Each process owns resources allocated by the operating system (OS) of their node. Resources may include memory, file handles, sockets, device handles, and windows. At least one thread exists within each process. If multiple threads can exist within a process, then they share the same memory and file resources. Threads provide a way for a program to split itself into two or more simultaneously (or pseudo-simultaneously) running tasks. Threads and processes differ from one operating system to another but, in general, a thread is contained inside a process and different threads in the same process share some resources while different processes do not.

Each node of a distributed system is prepared to handle messages, events, and unexpected failures that could occur at any time. A distributed system checker may check code against many possible events to detect bugs in a distributed system. The events may include machines crashes, network partitions, and packet losses, for example. The distributed system checker may check a distributed system that can have multiple threads and multiple processes running on multiple nodes.

Figure 2:
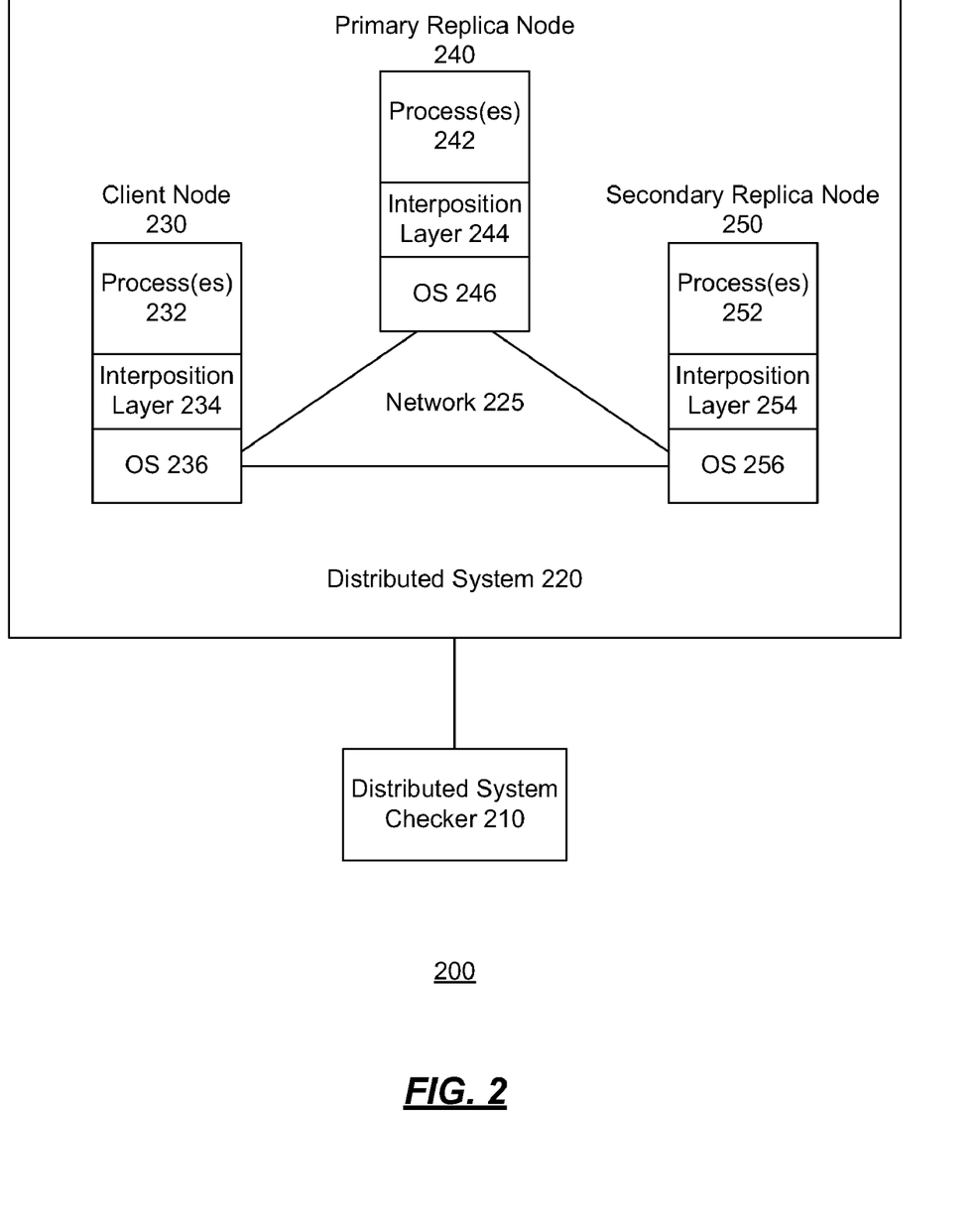
FIG. 2 is a block diagram of an implementation of a distributed system checker with a distributed system.

FIG. 2 is a block diagram of an implementation of a distributed system checker 210 with a distributed system 220. The distributed system checker 210 as described further herein may be implemented on any computer such as that described with respect to FIG. 7, for example. The distributed system 220 that is shown is directed to a three node replication system and comprises three nodes, a client node 230, a primary replica node 240, and a secondary replica node 250, that are connected via a network 225. However, any distributed system with any number of nodes may be used with the techniques described herein.

Each node 230, 240, 250 may comprise one or more processes 232, 242, 252, respectively. In an implementation, one process may be run per node, and the terms node and process may be used interchangeably herein in such an implementation. Additionally, each node 230, 240, 250 may comprise an OS 236, 246, 256, respectively.

To obtain control over the distributed system 220, the distributed system checker 210 may insert an interposition layer between the process(es) and the OS on each node. An interposition layer 234 may be provided between the process(es) 232 and the OS 236 on the client node 230. Similarly, an interposition layer 244 may be provided between the process(es) 242 and the OS 246 on the primary replica node 240, and an interposition layer 254 may be provided between the process(es) 252 and the OS 256 on the secondary replica node 250.

The distributed system checker 210 may be interposed on an application programming interface (API) between each process and its OS for realistic and deterministic failure simulation. Thus, in an implementation, for each node, the interposition layer may be provided on the API between the process(es) and the OS. An API is a set of functions, procedures, methods, or classes that an operating system, library, or service provides to support requests made by computer programs. This may allow the distributed system checker 210 to control the system behavior of the distributed system 220 at the API level and does not require that the distributed system 220 use a particular programming model or simulation framework.

The boundary between the process(es) and the OS for each node is a stable layer and may be used for the interposition layer. Interposing at a higher layer inside a process loses the generality of checking other processes, and interposing lower inside the OS involves modifying a multi-million-line OS kernel which is highly complex.

In an implementation in which the distributed system checker 210 and the distributed system 220 are based on Microsoft's Windows, interposing may be performed at the WinAPI layer, which is the native interface for Windows applications. The Windows API, referred to as WinAPI, is Microsoft's core set of APIs available in the Microsoft Windows operating systems. All Windows programs interact with the Windows API regardless of the language. The distributed system checker 210 may intercept on each of the nodes the place where they call through on a core interface, e.g. the WinAPI layer, and may provide unexpected events to the nodes to check the distributed system 220. The distributed system checker 220 may be implemented on any operating system and may be applied to any distributed system.

In an implementation, the distributed system checker 210 may be centralized and the interposition layer may expose the events in generic form to the centralized distributed system checker. The distributed system checker 210 may be operating system-independent. The distributed system checker 210 may transparently model check unmodified distributed systems running on an unmodified operating system. This transparency may be achieved using the interposition layer to expose the actions in the distributed system 220 and deterministically schedule them at the centralized, OS-independent checker.

The interposition layer in each node may simulate a variety of events, including API failures (e.g., memory allocation or disk read failures), rare message orders, message loss, network partitions, and machine crashes, for example. The distributed system checker 210 may simulate these events via the interposition layer as described further herein. A node in the distributed system 220 may send and receive messages that may be used to approximate a state the node is in. The interposition layer ensures that these simulated events are deterministic and consistent.

In an implementation, the distributed system checker 210 imposes no programming model, has no language restriction, and may be extended with user specified domain knowledge to improve coverage and performance. As described further herein, effective state reduction techniques may be used, including using state signatures for duplicate state detection and separating system level control and application level state exploration.

The distributed system checker 210 may simulate exceptions as part of the effort for detecting bugs in the distributed system 220 and may observe the environment. Systematic explorations of possible error causes may be performed. The distributed system checker 210 may systematically explore possible actions with its control over the system execution as well as its ability to inject rare events at predetermined points. Such events include machine crashes, message losses, different message orders, and network partitions. The distributed system checker 210 may detect "fail-stop" bugs (e.g., program assertion failures, segmentation faults, etc.), deadlocks and infinite loops, as well as violations to the global assertions provided by programmers. When the distributed system checker 210 detects an error, it may store a trace of the actions that have brought the distributed system 220 into the error state, so users can deterministically reproduce the error.

The distributed system checker 210 may simulate failures realistically and deterministically. Failures and other actions are often correlated. When the distributed system checker 210 notifies a node A of the crash of another node B, node B should stop sending more messages; otherwise, the distributed system checker is creating unrealistic scenarios, which could lead to difficult to diagnose false positives. Failure simulation is also deterministic. Relying on the OS for failure signaling leads to non-determinism. The distributed system checker 210 may keep track of a list of actions that are affected by failures. When injecting a failure, the distributed system checker 210 may make its effect immediate by cancelling the affected actions.

In an implementation, the distributed system checker 210 may use model checking techniques. Model checking excels at exploring corner cases. A corner case is a situation that occurs only outside of normal operating parameters, e.g., one that manifests itself when multiple parameters are simultaneously at extreme levels, even though each parameter is within the specified range for that parameter. Corner cases are often harder and more expensive to reproduce, test, and optimize because they use maximal configurations in multiple dimensions. Given a set of initial states together with some safety properties, a model checker may systematically explore the possible states of the system to check whether the properties are violated. A variety of techniques exist to make the state exploration process more efficient. In model checking, failures and other rare states are explored similar to common states, thereby quickly driving a system into corner cases for errors. The distributed system checker 210 may use implementation level model checking to check code directly and avoid the upfront cost of writing an abstract model.

The distributed system checker 210 may be customized by a user to write distributed assertions for global invariant checking, to define state digests for checking state equivalence more precisely, and to provide heuristics for guiding the exploration of the state space. These customization capabilities may improve the efficiency and effectiveness of the distributed system checker 210 by leveraging users' domain knowledge of the distributed system 220 being checked.

In an implementation, a state exploration framework may be provided for incorporating heuristics to detect distributed systems errors effectively. State space reduction techniques and state exploration heuristics may be used. In an implementation, a heuristic exhaustively explores network-related actions (such as sending or receiving messages), while bounds the number of thread interleaving it explores. Such a heuristic, combined with dynamic partial order reduction, may effectively bias the systematic exploration towards protocol-level behaviors.

A queue of the state/action pairs to be explored may be maintained. Due to the complexity of a distributed system, it is often infeasible to explore exhaustively the complete state space. Deciding which new state/action pairs to be added to the queue, as well as the order in which those state/action pairs are added and explored, may be used in a model checking process.

In an implementation, the checker tags each state with a vector clock and implements a customizable modular framework for exploring the state space, so that different reduction techniques and heuristics can be incorporated.

In an implementation, the checker takes the first state/action pair <s,a> from the queue, controls the system execution to reach that state s if that is not the current state, applies the action a, reaches a new state s', and examines the new resulting state for errors. It then calls a customizable function "explore". The explore function takes the path from the initial state to s and then s', where each state is tagged with its vector clock and each state transition is tagged with the action corresponding to the transition. For s', the enabled actions are provided to the function. The function then produces a list of state/action pairs and indicates whether the list should be added to the front of the queue or the back. The checker inserts the list into the queue accordingly and repeats the process.

For dynamic partial order reduction (DPOR), the explore function works as follows. Let a be the last action causing the transition from s to s'. The function looks at every state $s_p$ before s on the path and the action $a_p$ taken at that state. If a is enabled at $s_p$ (i.e., if s and $s_p$ are concurrent as judged by the vector clocks) and a does not commute with $a_p$ (i.e., the different orders of the two actions could lead to different executions), $<s_p,a>$ is added to the list of pairs to explore. Once all states are examined, the function returns the list and has the checker insert the list to the queue. The function could choose to use depth first search or breadth first search depending on how the list is inserted. Also, by ordering the pairs in the list differently, the checker may be instructed to explore the newly added branches in different orders (e.g., top-down or bottom-up.)

The explore function can be constructed to favor certain actions (such as crash events) over others, to bound the exploration in various ways (e.g., based on the path length, number of certain actions on the path, etc.), and to limit the focus on a subset of possible actions. Having the checker run in different subsets of possible actions could help control the state explosion at the expense of coverage.

The checker may implement both process-level and thread-level vector clocks. For thread-level vector clocks, the checker may handle the dynamic creation of threads. Due to such dynamism and the often large number of threads, thread-level vector clocks tend to introduce significant complexity and overhead. The checker may support process-level vector clocks for added flexibility of the framework. This can be considered as an approximation of thread-level vector clocks because many distributed systems can be approximated as a state machine with mostly deterministic behavior in response to inputs (i.e., messages). In this kind of reactive system, the nondeterminism of the system mainly comes from the non-deterministic protocol-level behaviors such as delivery of messages, while a large number of the interleaving of threads within processes do not have different effects on the protocol-level state of the distributed system.

Figure 3:
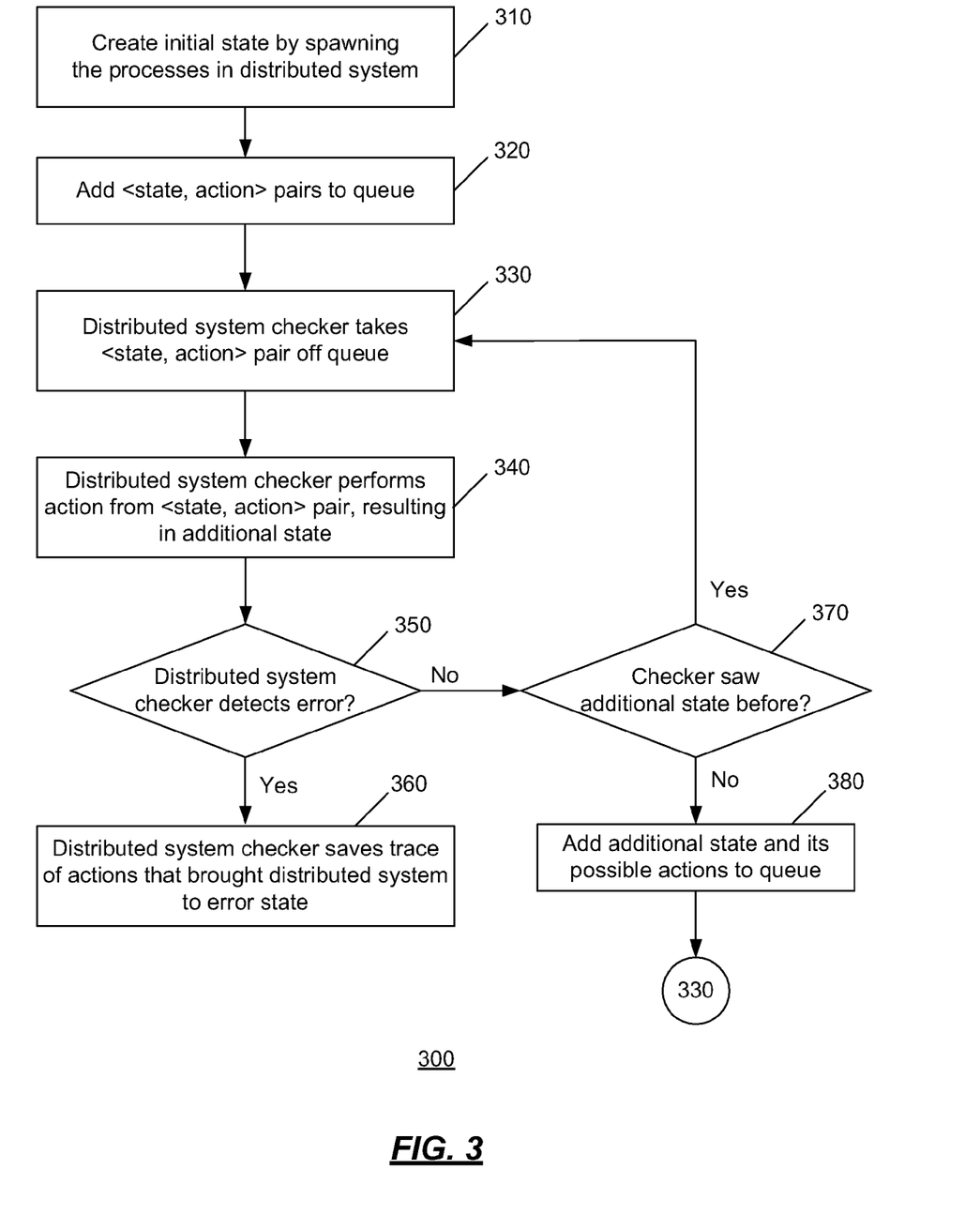
FIG. 3 is an operational flow of an implementation of a method of checking a distributed system.

FIG. 3 is an operational flow of an implementation of a method 300 of checking a distributed system. At 310, an initial state may be created by spawning the processes in a distributed system based on a user's configuration. Spawn is a function that loads and executes a new child process in the OS. From the initial state, the processes may perform many actions, such as scheduling a thread or receiving a packet, for example. The distributed system checker may also inject failure actions such as crashing a process or disconnecting the network between two processes, for example. A user may determine <state, action> pairs and may add the <state, action> pairs to a queue at 320, where the queue is initialized with entries whose state field is the initial state.

The distributed system checker may explore the possible states and actions. The distributed system checker may take a <state, action> pair off the queue at 330, and may perform the action on the state at 340. The <state, action> pair that may be taken off the queue may be determined based on predetermined heuristics. To perform an action on a state, the distributed system checker brings the system to that state first. The distributed system checker spawns and runs processes on top of their native OS. Since it is complicated to checkpoint all processes by saving their states, the distributed system checker may use a stateless approach: the distributed system checker may checkpoint a state by remembering the actions that created the state, and may restore the state by redoing all the actions. Performing the action at 340 may lead the system to an additional state.

At 350, it may be determined if the resulting additional state from 340 leads to an error (e.g., a failure) in the distributed system. If so, the distributed system checker may save a trace of the actions that brought the system into the error state at 360 for debugging purposes, e.g., so that a user may replay the trace to reproduce the error.

If no error is detected at 350, it may be determined at 370 if the resulting additional state from 340 is a state that the distributed system checker has seen before. If not, the distributed system checker may add the additional state and its possible actions to the queue at 380. After adding the additional state and actions to the queue or if the additional state was seen before, processing may continue at 330 with the distributed system checker taking another <state, action> pair off the queue and continuing the process.

Figure 4:
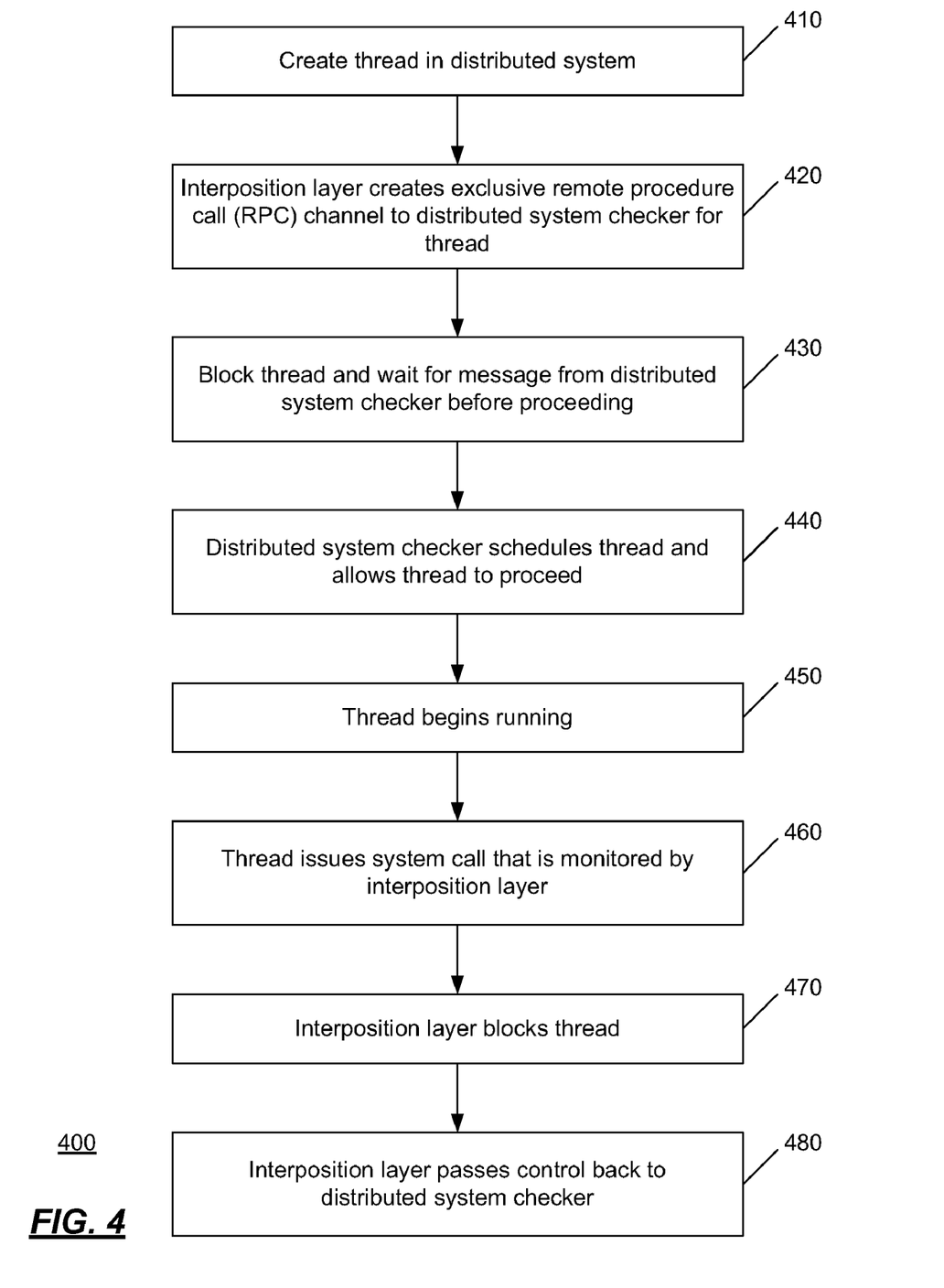
FIG. 4 is an operational flow of an implementation of a method of control with a distributed system checker.

For systematic exploration, the distributed system checker cannot let the OS schedule the processes and threads in the distributed system arbitrarily. The distributed system checker may obtain control of the distributed system using the interposition layer. In an implementation, for systematic exploration, the distributed system checker determines the threads in the distributed system and determines whether they are enabled (e.g., not blocked). FIG. 4 is an operational flow of an implementation of a method of control with a distributed system checker. A thread may be created in the distributed system at 410. At 420, the interposition layer may create an exclusive remote procedure call (RPC) channel to the distributed system checker for this thread at 420.

The thread may be blocked at 430 and may wait for a message from the distributed system checker before proceeding. At some point, the distributed system checker may schedule the thread by sending a message to the interposition layer and allow the thread to proceed at 440. The thread may begin running at 450.

At 460, the thread may issue a system call that is monitored by the interposition layer (e.g., acquiring a mutex or mutual exclusion which is used in concurrent programming to avoid the simultaneous use of a common resource by pieces of computer code called critical sections). Once the running thread issues the system call at 460, the interposition layer may block the thread at 470 and may pass control back to the distributed system checker at 480. This approach ensures a distributed system acts under control of a distributed system checker. In an implementation, at any time, only one action is running, and the execution of the entire distributed system may be trivially serializable and deterministic.

In an implementation, the interposition layer may hook two types of WinAPIs: (1) those that change the number of threads in the system, including CreateThread( ), ExitThread( ), and TerminateThread( ), and (2) those that affect the enabled status of threads, such as SuspendThread( ), ResumeThread( ), EnterCriticalSection( ), and LeaveCriticalSection( ). When these functions are called, the distributed system checker may take control and update its internal data structures to track the threads and their statuses.

Asynchronous IOs (AIOs) represent "hidden" threads of execution inside the kernel of the OS. The distributed system checker may control AIOs for systematic exploration. This control may be used for exploring rare message orders because the distributed system may use network AIO to boost performance.

Using packet receiving as an example, AIO in Windows may work as follows. A user may call WSARecv( ) with an empty completion notification structure to express their intent to receive a packet. WSARecv( ) immediately returns, even though the message has yet to arrive. When the message arrives, the kernel fills the completion notification structure and notifies the application. Later, a user may call GetQueueCompletionStatus( ) to dequeue IO completion notifications.

The distributed system checker may not let the kernel decide the order in which completion notifications are posted. The interposition layer may create a proxy event and a proxy thread for each AIO in order to hijack the kernel's completion notification. When an AIO is submitted, the interposition layer replaces the application's completion notification structure with the proxy event for this AIO, and lets the proxy thread wait for the event. When the kernel delivers the completion notification for the AIO, the proxy thread receives it. Since the proxy thread is also under the distributed system checker's control, this mechanism lets the distributed system checker obtain full control over AIO.

In an implementation, the interposition layer may handle blocking networking operations such as connect, accept, send, and receive, for example, and may handle AIO-related networking operations such as ConnectEx( ), AcceptEx( ), WSARecv( ), WSASend( ), GetQueuedCompletionStatus( ), and WSAGetOverlappedResult( ) (queries the completion status of a single AIO request), for example.

Rare message ordering is a cause of errors. Since the interposition layer converts an AIO into a proxy thread and uniformly handles proxy threads and regular threads, the distributed system checker can explore the ordering of different AIO events via the same mechanism it uses to explore thread interleavings. For example, if a process issues two operations such as WSARecv( ) to receive two messages $m_1$ and $m_2$, the distributed system checker can explore all possible message orders by running the proxy thread for $m_1$ first, then the thread for $m_2$, or running the thread for $m_2$ first, then the thread for $m_1$.

The proxy threads may be considered to implement a simulated network in that the messages that reach proxy threads but not the distributed system are still "infight" in the network. This mechanism may be used to handle synchronous network operations as well. Such an approach avoids the overhead of building a network simulator and porting the distributed system to run within.

A thread scheduling action may be tagged with a set of information in order to help search heuristics determine the exploration order. When the interposition layer blocks a thread, it may notify the distributed system checker which API function the thread is about to issue. Optionally, a user may provide functions to compute signatures for given network messages. The interposition layer may send message signatures to the distributed system checker as well. With this information, the distributed system checker may perform a search, as described further herein.

The distributed system may have non-deterministic choices of actions that are not exposed for checking. For example, it could call rand(time( )) and perform different actions based on the return value. In an implementation, non-determinism for checking may be handled by setting the actions to be deterministic, or exposing and exploring the actions. Determining which option to use is a tradeoff between manual overhead and coverage.

The distributed system checker may provide a method, choose(N), to expose the choices in the distributed system. Given a choice point that has N possible actions, a node may insert a call "choose(N)," which will appear to fork execution N times, returning the values 0, 1, . . . , N−1 in each node execution, respectively. A user may then write code that uses this return value to pick an action out of the N possibilities. The distributed system checker can exhaust the possible actions at this choose call by running the forked children. An example of using a choose call is provided below.

In an implementation, a distributed system checker may check a distributed system against the following types of failures for example: API failures (e.g., memory allocation failures, disk read failures, etc.), message loss, network partitions, machine crashes, timeouts, and rare message orders.

Regarding API failures, an API may be used by a process to read data from a disk. In normal execution, reading the data succeeds; however, a failure may occur if the underlying disk is bad. If the distributed system is run as is, the success case would likely result, missing the disk read failure case. Prior model checkers have the user manually insert choose calls. In an implementation, a distributed system checker may interpose the API with an interposition layer and may automatically expose and explore the success and failure choices within the API. In an implementation with WinAPI, the following types of functions may be checked for failure: resource allocators such as malloc (or the C++ equivalent operator new), CreateThread, and WSASocket (WinAPI to allocate a socket), and file system operations such as CreateFile, ReadFile, and WriteFile.

Regarding message loss, because an AIO may be converted into a thread, message loss may be simulated by letting the proxy thread of an AIO deliver a failed IO completion notification to the distributed system.

In an implementation, the distributed system checker can simulate network disconnection between two processes to simulate network partition. The distributed system checker may simulate a network partition between two processes by blocking all communication between them. For this purpose, the distributed system checker may use an interposition layer to track the open connections in the checked distributed system. When a connection is established, the interposition layer may notify the distributed system checker. When the distributed system checker decides to break the connection between two processes, it sends a notification to the interposition layer in each process and marks the socket descriptor corresponding to the connection as broken. The interposition layer keeps a list of such broken sockets, and only removes a socket from this list when the distributed system explicitly closes the socket. The distributed system checker may fail any attempt to send or receive through one of the broken sockets immediately without issuing real system calls.

The distributed system checker may simulate a machine crash by physically killing a process (i.e., calling WinAPI TerminateProcess( )). Only states persisted on disk files may be carried over between crash and recovery. To generate possible disk states that could occur after a crash, the distributed system checker may construct a set of disk blocks that may be cached in memory and would have been lost after a crash. Suppose the current disk is D and there are two disk blocks $b_1$ and $b_2$ cached in memory. The distributed system checker may permute these writes to generate disk images that could occur: D, $D+b_1$, $D+b_2$, and $D+b_1+b_2$. The distributed system checker checks distributed systems running on top of an OS, and may compute the set of potentially cached disk blocks by interposing WinAPI WriteFile( ), WriteFileGather( ), and FlushFileBuffers( ), thus avoiding writing a kernel driver.

Many distributed systems have liveness detectors to detect network failures or machine crashes. The liveness detectors typically wake up periodically and use the absence of beacons from a remote machine for a certain period of time as an indicator that there is a network failure or the remote machine has crashed. When the distributed system checker kills a process, it notifies liveness detectors of the processes that have connections to this process. In an implementation, the distributed system checker requests the liveness detector wait on a special liveness event, liveness_notify_event, instead of waking up periodically. When the distributed system checker partitions the network or kills a machine, it sets the event and wakes up the liveness detectors in involved processes.

The distributed system checker may handle timeouts similar to the way it handles liveness detectors. System code may have timeouts such as explicit timeouts, where a user explicitly tells the OS the timeout values, either by registering a timer or waiting for a known amount of time, implicit timeouts, where a user may call to get a time of day or similar functions and compare the returns, and kernel timeouts, where the timeout is completely decided by the kernel.

To handle explicit timeouts, in an implementation, the distributed system checker may track which failure can trigger a timeout, and only fires the timeout when it simulates the failure to avoid false positives. For example, a thread can wait for a message and if the message does not arrive in five seconds, it times out. The interposition layer may replace this timeout with infinite and may block the calling thread. Only when the corresponding connection is broken or the other communication end is killed will the distributed system checker trigger this timeout.

For implicit timeouts, since the distributed system checker does not see the timeout value, it returns deterministic values for calls to get a time of day, or the WinAPI methods GetTickCount( ), GetSystemTime( ) and GetSystemTimeAsFileTime( ), for example. Users who want to get more coverage can use a distributed system checker provided method to advance the time in combination with a choose call to manually fire implicit timeouts.

For kernel timeouts, failures may be made immediate. The distributed system checker may track events that may be affected by a failure. When simulating a failure, the distributed system checker may fail the dependent events.

Due to the state explosion problem of model checkers, exhaustively exploring the entire search space of a distributed system may be infeasible. Previous model checkers do not distinguish different states and actions by mixing control of the system with exploration of state space. This often leads to the exploration of uninteresting states. In an implementation, the distributed system checker separates the mechanisms that control the system to achieve deterministic execution from the mechanisms that guide the system state exploration.

A typical distributed system consists of many processes running on different machines, and each process usually has multiple threads. Processes synchronize and communicate with each other by passing messages. In order to make the system less complex to debug, many distributed systems follow the state machine approach, where each process is approximated as a state machine with deterministic behavior in response to inputs (i.e., the messages).

A distributed system checker may be limited to considering application level behaviors such as sending and receiving messages, failure of a network, and crashing of processes, and their interleaving. A bounding heuristic may be provided that bounds state exploration and focuses on exploring more application level behaviors. System level control and application level exploration may thus be separated. A distributed system may involve multiple processes, each running multiple threads, and the distributed system checker may take control of such a system by controlling all the low-level system decisions, including thread scheduling. However, bugs may be more easily manifested e.g., for analysis, debugging, troubleshooting, etc. at the application level. For example, bugs based on thread scheduling are less informative than bugs based on network actions (e.g., send or receive messages) or failures.

Figure 5:
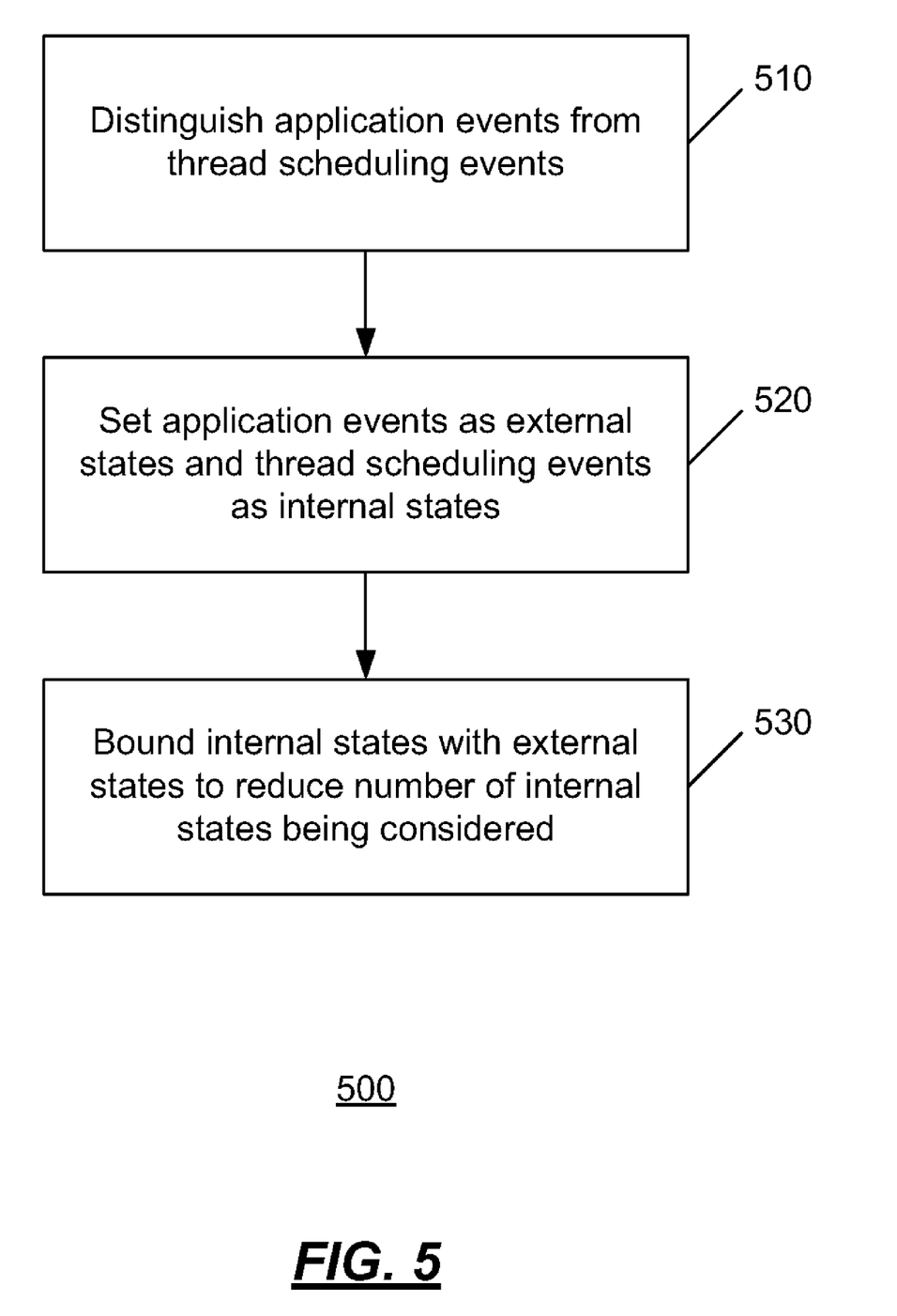
FIG. 5 is an operational flow of an implementation of a method of a bounding heuristic that may be used with a distributed system checker.

FIG. 5 is an operational flow of an implementation of a method 500 of a bounding heuristic that may be used with a distributed system checker. Bounding separates actions into two classes, internal states and external states, and bounds the number of internal states that can occur between two external states.

At 510, application events may be distinguished from thread scheduling events. At 520, the application events are set as external states. An external state is a state that the only possible transitions are application level events such as message delivery or node crashing and recovery. In an external state, threads are either blocked or idle looping (i.e., threads periodically wake up and get back to sleep again). An external state transits into another external state by going through a set of internal states, where threads become enabled in response to the application level events. For example, in a distributed file system, when a node receives a request to update to a file, it may update local file states as well as send messages to other nodes for data replication. These actions may be carried out by several threads within the process. The interleaving of these threads may be less informative to consider for debugging than, for example, one of the replication messages being lost.

At 530, internal states may be bounded with external states. The number of paths following each external state may be bounded to reduce the number of internal states being considered. Due to idle looping, the path between two external states might be infinitely long. Therefore, for each path, the length of internal transitions between two external states may be bounded.

Application level events may occur at an internal state. For example, between receiving a message and sending a reply, a node may crash or recover. The number of application level transitions may be bounded between two external states. If the bound is 0, the distributed system may behave as if it were event driven: each node receives a message, processes it, and potentially sends replies. It then blocks and waits for the next message. As the bound is increased, more states may be considered.

A user may guide state consideration. Given a distributed system, without user intervention, in an implementation, a distributed system checker may explore the event interleavings systematically. However, in many cases, even with the internal state bounding, exhausting all states is infeasible. In many cases, a user may know which states to consider.

In an implementation, a user may provide the distributed system checker with guidance for choosing the states to consider. In a distributed system checker, the transitions are tagged with rich information. A user may modify the techniques of adding and removing information from the queue (e.g., of the method 300 of FIG. 3) by examining the tagged information of the transitions and giving different priorities and/or filtering out certain events.

Figure 6:
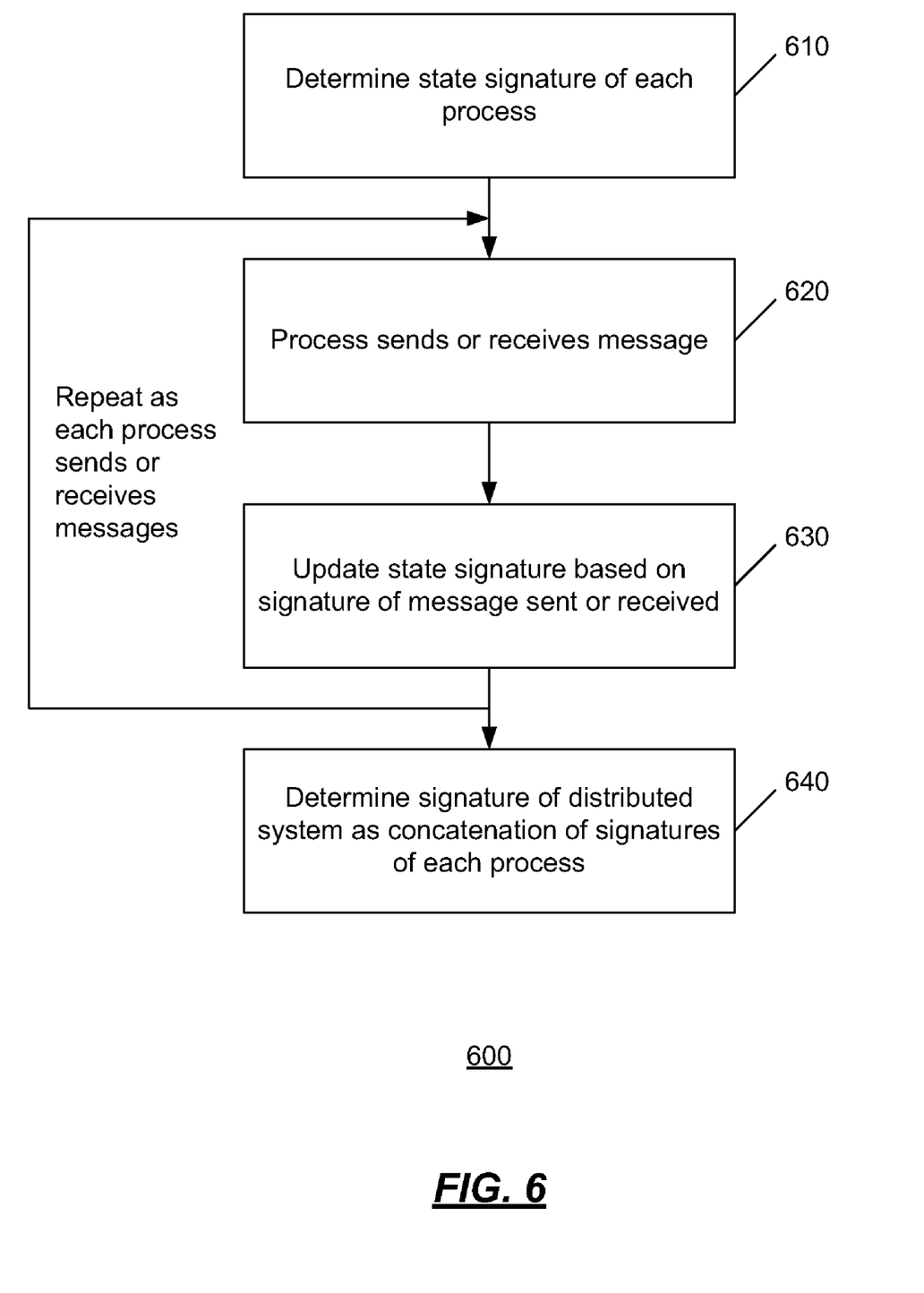
FIG. 6 is an operational flow of an implementation of a method of determining a state signature that may be used with a distributed system checker.

State signatures may be used to detect the states that have been considered before and are not to be considered again. To avoid redundantly considering the same state twice, a model checker may keep a signature for each state it sees. FIG. 6 is an operational flow of an implementation of a method 600 of determining a state signature that may be used with a distributed system checker.

In an implementation, a state signature of each process in a distributed system may be determined incrementally based on the messages it sends and receives and their order. The state signature for a process may be determined incrementally to avoid saving a history of messages. At 610, a state signature of a process may be determined, e.g., using any known function. At 620, the process may send or receive a message. At 630, the state signature may be updated based on the signature of the message that has been sent or received. Processing may continue at 620 as the process sends or receives additional messages. The signature of the distributed system may be determined at 640 as a concatenation of signatures of each process.

Suppose the current state signature of a process is sigp. After the process receives a message, the state signature may be updated as sigp=hash(sigp, RECV, sigm), where sigm is the message signature. After the process sends a message, its signature may be updated as sigp=hash(sigp, SEND, sigm). These updates resemble the update of vector clock for tracking causality as is well known.

If a process receives the same set of messages in the same order, and sends out the same set of messages in the same order, then it is highly likely to be in the same state. In an implementation, state signatures may be determined only for external states. Since the total number of internal states is bounded between two external states, and the distributed system checker uses a random strategy to explore internal states, it is unnecessary to determine signatures for internal states.

In an implementation, after the distributed system checker simulates a network failure or a machine crash, it may notify related or affected processes. The notifications may affect process states, and process state signatures may be updated for these processes.

In an implementation, because an application level message may be broken down into several socket-level sends and receives, each message may have a code or a number appended to it to mark the end of the message. The code or number may serve to identify message boundaries that may be used by the distributed system checker in the determination of message signatures.

Figure 7:
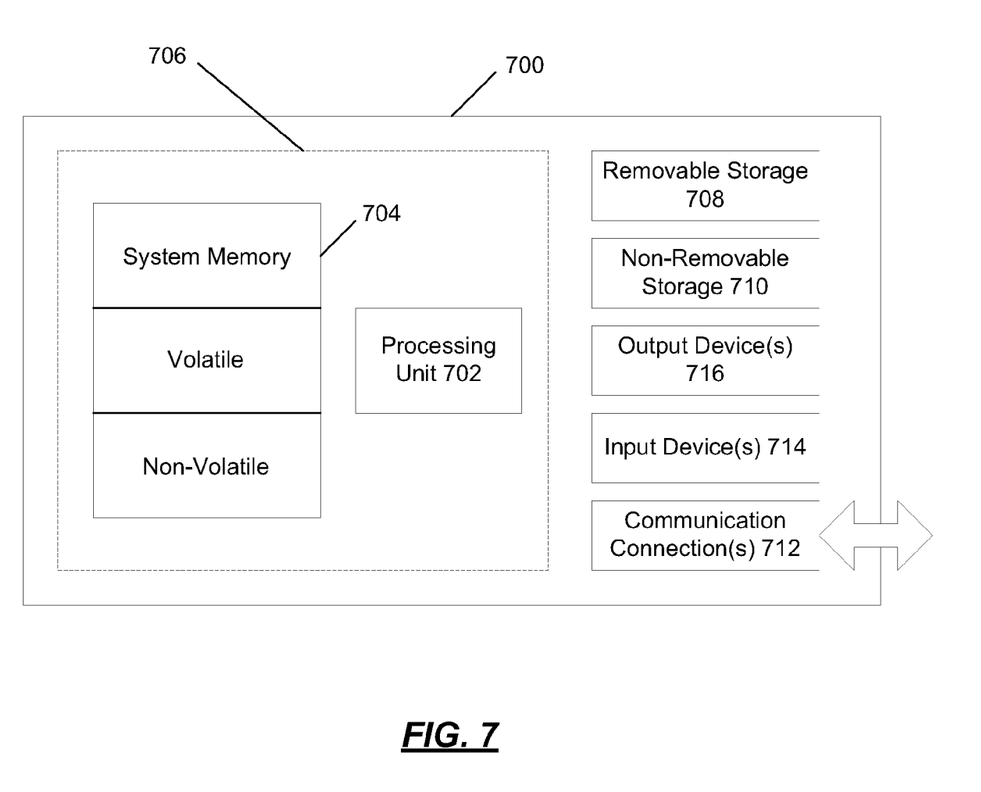
FIG. 7 shows an exemplary computing environment.

FIG. 7 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

Computing device 700 may be one of a plurality of computing devices 700 inter-connected by a network. As may be appreciated, the network may be any appropriate network, each computing device 700 may be connected thereto by way of communication connection(s) 712 in any appropriate manner, and each computing device 700 may communicate with one or more of the other computing devices 700 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
a distributed system comprising a plurality of nodes, each node running a process and an operating system and comprising an interposition layer provided between the process and the operating system; and
a distributed system checker in control over the distributed system via the interposition layer on each node.

2. The system of claim 1, wherein the interposition layer is provided on an application programming interface (API) between the process and the operating system on each node.

3. The system of claim 2, wherein the distributed system checker is in control over the distributed system at the API level.

4. The system of claim 1, wherein the interposition layer simulates a plurality of events to detect a bug in the distributed system.

5. The system of claim 4, wherein the plurality of events comprise at least one of a machine crash, a network partition, a message reorder, a message loss, or an application programming interface failure.

6. The system of claim 1, wherein the distributed system checker provides an unexpected event to the nodes via the interposition layer to check the distributed system.

7. The system of claim 1, wherein the distributed system checker separates system level control and application level state exploration in checking the distributed system for a bug.

8. The system of claim 1, wherein each node in the distributed system sends and receives a plurality of messages, each message associated with a state of the node.

9. The system of claim 1, wherein the distributed system checker determines a state signature of each process in the distributed system based on a plurality of messages of each process.

10. The system of claim 1, further comprising a bounding heuristic used in a checking of the distributed system, the bounding heuristic separating each of a plurality of actions that run on the distributed system into an internal state or an external state and bounding a number of internal states between a plurality of external states.

11. A method of checking a distributed system, comprising:
adding a plurality of state and action pairs to a queue;
performing one of the actions from the state and action pairs on the distributed system; and
detecting an error in the distributed system pursuant to performing the one of the actions.

12. The method of claim 11, further comprising spawning a plurality of processes in the distributed system to create an initial state prior to performing the one of the actions from the state and action pairs on the distributed system.

13. The method of claim 11, wherein performing the one of the actions results in an additional state, further comprising adding the additional state and at least one action associated with the additional state to the queue.

14. The method of claim 11, further comprising saving a trace of the action that brought the error to the distributed system.

15. The method of claim 11, wherein performing the one of the actions from the state and action pairs on the distributed system comprises providing the action to the distributed system via an interposition layer on the distributed system.

16. A method of checking a distributed system, comprising:
providing an interposition layer to a node in the distribution system on an application programming interface (API) between a process and an operating system on the node;
simulating an event on the node via the interposition layer; and
determining whether a bug occurs in the distributed system based on the event.

17. The method of claim 16, further comprising controlling the distributed system via the interposition layer.

18. The method of claim 17, wherein controlling the distributed system comprises determining a plurality of threads in the distributed system and determining whether each of the threads is enabled.

19. The method of claim 17, wherein controlling the distributed system comprises blocking a thread in the distributed system, scheduling the thread, sending a message to proceed to the thread, monitoring the thread by the interposition layer, and passing control to a distributed system checker via the interposition layer.

20. The method of claim 16, further comprising determining whether the event is an application event or a thread scheduling event, setting the event as an external state if the event is an application event, setting the event as an internal state if the event is a thread scheduling event, and if the event is set as the internal state then bounding the internal state with a plurality of external states.

* * * * *